(12) United States Patent
Tajima et al.

(10) Patent No.: US 7,919,897 B2
(45) Date of Patent: Apr. 5, 2011

(54) AXIAL GAP TYPE MOTOR

(75) Inventors: Shigeru Tajima, Saitama (JP); Keiichi Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/576,837

(22) Filed: Oct. 9, 2009

(65) Prior Publication Data

US 2010/0090555 A1     Apr. 15, 2010

(30) Foreign Application Priority Data

Oct. 9, 2008 (JP) ................................ P2008-262830

(51) Int. Cl.
*H02K 1/22* (2006.01)
*H02K 1/27* (2006.01)
*H02K 21/24* (2006.01)
*H02K 15/00* (2006.01)

(52) U.S. Cl. ... 310/216.016; 310/216.045; 310/216.046; 310/156.53; 310/156.56; 310/156.57

(58) Field of Classification Search .............. 310/156.08, 310/156.53–156.57, 216.004, 216.007, 216.008, 310/216.015–216.019, 216.045–216.046, 310/266–268

See application file for complete search history.

(56) References Cited

U.S. PATENT DOCUMENTS

| | | | |
|---|---|---|---|
| 3,591,819 A * | 7/1971 | Laing | 310/216.065 |
| 3,956,651 A * | 5/1976 | Brammerlo | 310/216.024 |
| 4,007,387 A | 2/1977 | Rustecki | |
| 4,095,150 A | 6/1978 | Senckel | |
| 4,363,988 A * | 12/1982 | Kliman | 310/268 |
| 4,410,820 A * | 10/1983 | Stanley | 310/216.047 |
| 4,864,175 A | 9/1989 | Rossi | |
| 4,996,457 A | 2/1991 | Hawsey et al. | |
| 5,245,238 A | 9/1993 | Lynch et al. | |
| 5,334,899 A | 8/1994 | Skybyk | |
| 5,387,854 A | 2/1995 | McCleer et al. | |
| 5,394,321 A | 2/1995 | McCleer et al. | |
| 5,397,953 A | 3/1995 | Cho | |
| 5,642,009 A | 6/1997 | McCleer et al. | |
| 5,671,524 A * | 9/1997 | Damsky et al. | 29/596 |
| 5,731,649 A * | 3/1998 | Caamano | 310/216.047 |
| 5,907,210 A | 5/1999 | Chaix | |
| 5,925,965 A | 7/1999 | Li et al. | |
| 5,955,809 A | 9/1999 | Shah | |
| 6,373,162 B1 | 4/2002 | Liang et al. | |

(Continued)

FOREIGN PATENT DOCUMENTS

EP     1612913 A2     1/2006

(Continued)

*Primary Examiner* — Tran N Nguyen
(74) *Attorney, Agent, or Firm* — Arent Fox, LLP

(57) ABSTRACT

An axial gap type motor 10 includes: a rotor 11 having a rotor core 13, the rotor core 13 including: multiple main magnet pieces 41 respectively magnetized in a direction of the rotation axis O of the rotor, and multiple main magnet piece storing hole portions 15 respectively for holding associated main magnet pieces; and a pair of stators 12 to be mounted onto the rotor 11, wherein the rotor core 13 is structured by winding a tape-shaped magnetic plate 14, and includes a first winding layer and a second winding layer; and in portions of the first and second winding layers that are situated in the same phase from the center of rotation of the rotor core 13, the first winding layer includes an outside magnetic flux short preventive portions 62, and the second winding layer includes an outside connecting portions 61.

8 Claims, 10 Drawing Sheets

U.S. PATENT DOCUMENTS

| | | | |
|---|---|---|---|
| 6,809,453 B2 * | 10/2004 | Narita et al. | 310/216.008 |
| 6,960,860 B1 * | 11/2005 | DeCristofaro et al. | 310/216.113 |
| 7,144,468 B2 * | 12/2006 | Decristofaro et al. | 156/185 |
| 7,230,361 B2 * | 6/2007 | Hirzel | 310/216.074 |
| 7,315,102 B2 | 1/2008 | Minagawa | |
| 7,679,260 B2 | 3/2010 | Yamamoto et al. | |
| 7,737,594 B2 | 6/2010 | Abe et al. | |
| 2004/0070307 A1 | 4/2004 | Haugan et al. | |
| 2005/0194855 A1 | 9/2005 | Hasebe et al. | |
| 2005/0285467 A1 | 12/2005 | Shimizu | |
| 2007/0018520 A1 | 1/2007 | Kaneko et al. | |
| 2007/0170802 A1 | 7/2007 | Potoradi | |
| 2008/0129136 A1 | 6/2008 | Abe et al. | |
| 2008/0290752 A1 | 11/2008 | Yamamoto et al. | |
| 2009/0243422 A1 | 10/2009 | Atarashi et al. | |
| 2009/0251021 A1 | 10/2009 | Atarashi et al. | |
| 2009/0295245 A1 | 12/2009 | Abe et al. | |
| 2009/0295246 A1 | 12/2009 | Abe | |
| 2010/0090555 A1 | 4/2010 | Tajima et al. | |

FOREIGN PATENT DOCUMENTS

| | | | |
|---|---|---|---|
| EP | 1850451 A1 | 10/2007 | |
| JP | 59-230453 A | 12/1984 | |
| JP | 2-79174 U | 6/1990 | |
| JP | 6-500457 A | 1/1994 | |
| JP | 9-168263 A | 6/1997 | |
| JP | 10-271784 A | 10/1998 | |
| JP | 3062085 U | 6/1999 | |
| JP | 11-511948 A | 10/1999 | |
| JP | 2000-197301 A | 7/2000 | |
| JP | 2000-262026 A | 9/2000 | |
| JP | 2001-136721 A | 5/2001 | |
| JP | 2002-112481 A | 4/2002 | |
| JP | 2005-94955 A | 4/2005 | |
| JP | 2005-269778 A | 9/2005 | |
| JP | 2005-341696 A | 12/2005 | |
| JP | 2006-166635 A | 6/2006 | |
| JP | 2006-222131 A | 8/2006 | |
| JP | 2006-527578 A | 11/2006 | |
| JP | 2006-345627 A | 12/2006 | |
| JP | 2007-028868 A | 2/2007 | |
| JP | 2007-089270 A | 4/2007 | |
| JP | 2008-22663 A | 1/2008 | |
| JP | 2008-048497 A | 2/2008 | |
| JP | 2008-104278 A | 5/2008 | |
| JP | 2008-167639 A | 7/2008 | |
| WO | WO 96/29774 A1 | 9/1996 | |
| WO | WO 2004/109894 A1 | 12/2004 | |
| WO | WO 2006/077812 | 7/2006 | |

* cited by examiner

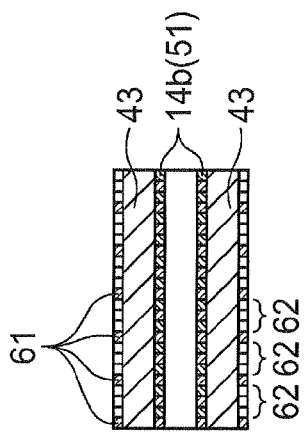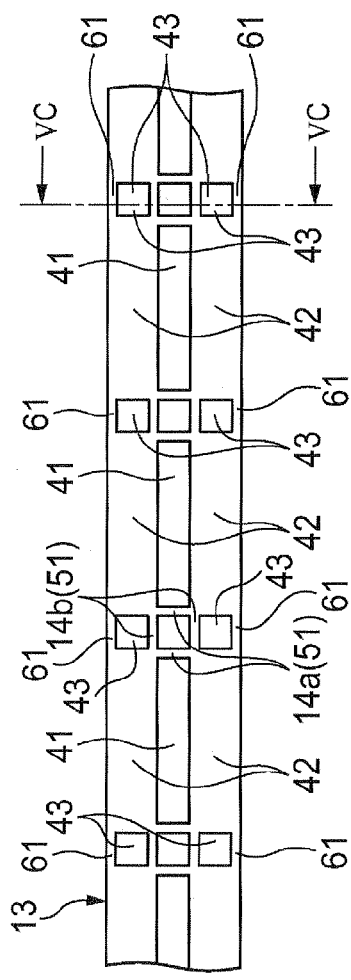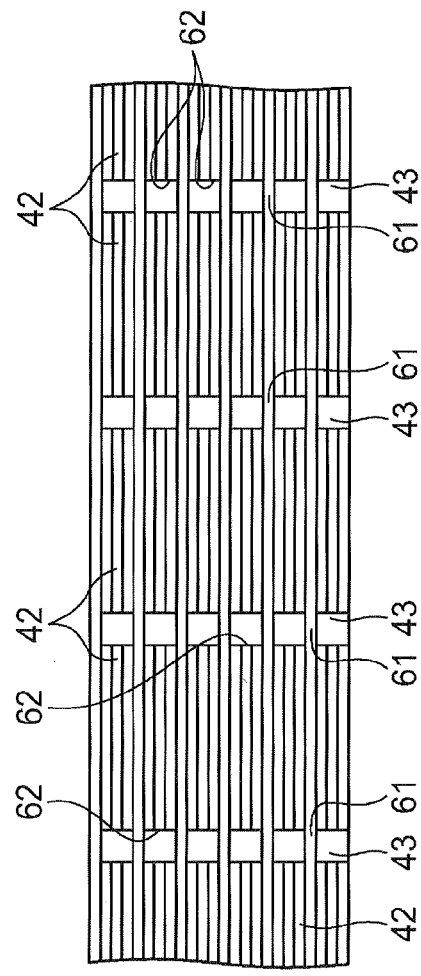

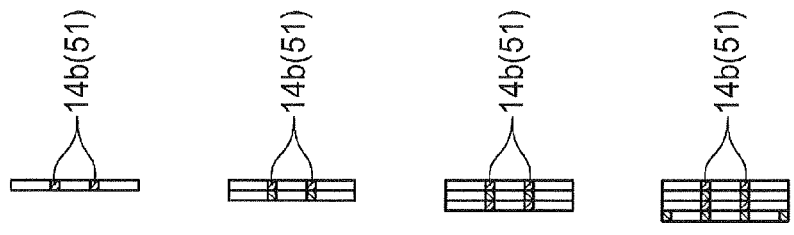
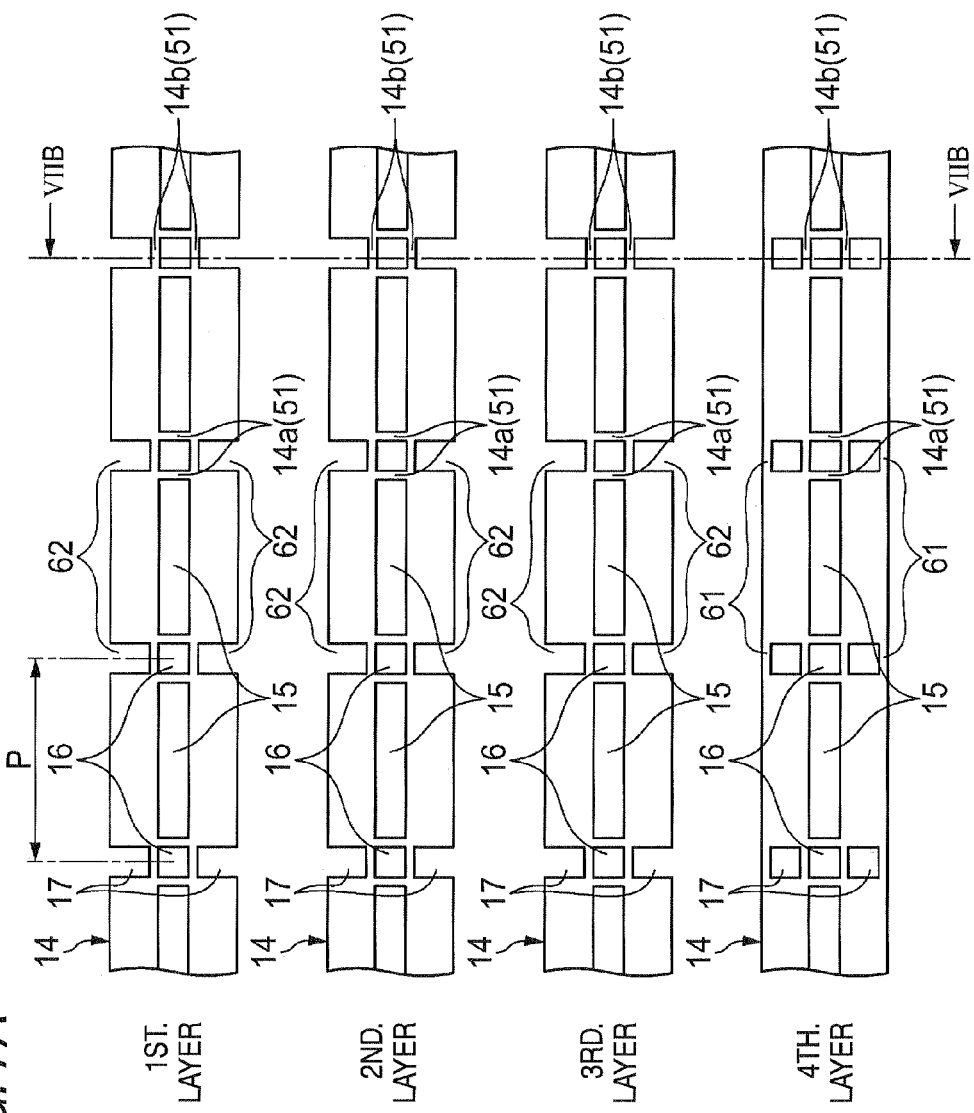

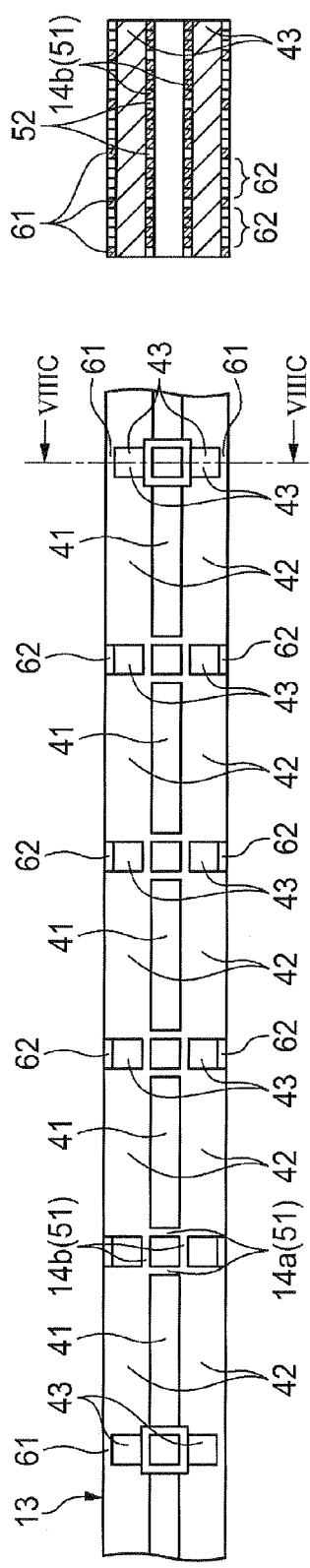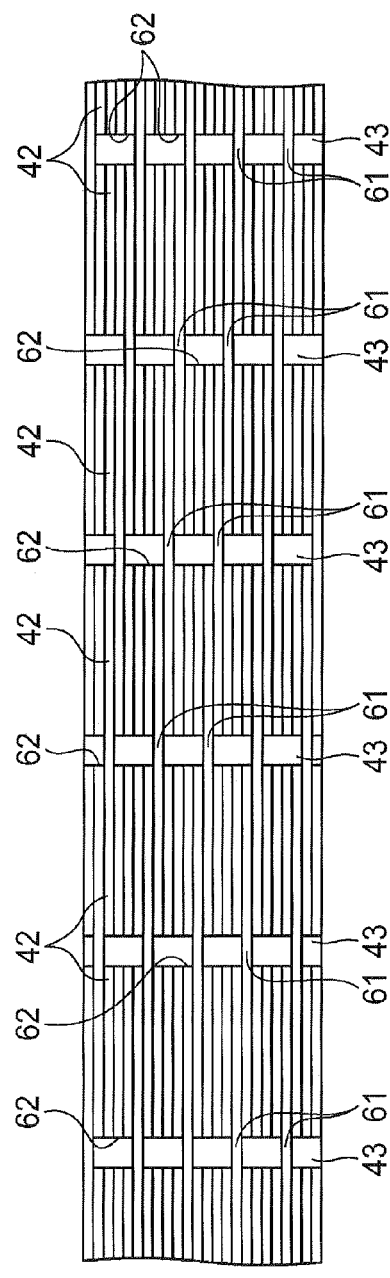

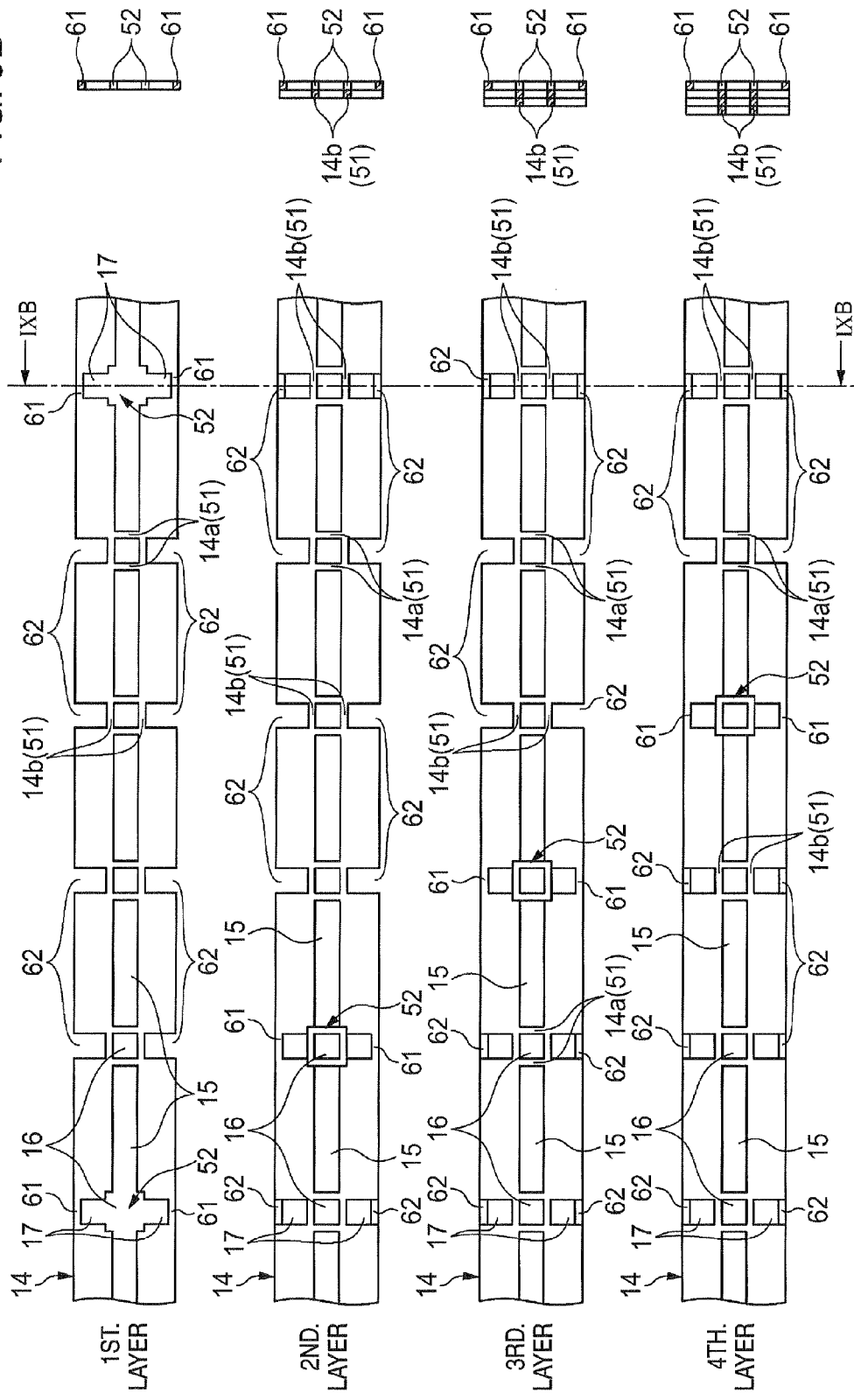

AXIAL GAP TYPE MOTOR

CROSS-REFERENCE TO RELATED APPLICATION

This application is based on and claims priority under 35 U.S.C. §119 from Japanese Patent Application No. 2008-262830 filed on Oct. 9, 2008.

BACKGROUND OF THE INVENTION

1. Technical Field

The present invention relates to an axial gap type motor.

2. Related Art

Recently, there is known an axial gap type motor which, for example, includes a rotor rotatable around a rotation axis and a pair of stators to be mounted onto the rotor from at least one side in the direction of the rotation axis such that they are disposed opposed to each other, and also in which, for the field flux that is produced by the permanent magnets of the rotor, there is formed a magnetic flux loop through the stators (for example, JP-A 2006-166635 (Patent Reference 1)).

As shown in FIG. 10, according to an axial gap type motor disclosed in the JP-A 2006-166635, to produce a rotor core 101, a tape-shaped electromagnetic steel plate 102 is wound and then, in the thus wound formed rotor core 101, there are formed multiple openings 104 at regular intervals in the peripheral direction of the rotor core 101 which are respectively used to store their associated magnet pieces 103 therein.

[Patent Reference 1] JP-A 2006-166635

In the axial gap type motor disclosed in the JP-A 2006-166635, however, since the portions of the rotor core 101 interposed between the magnetic pieces 103 and 103 adjoining each other in the peripheral direction of the rotor core 101 are formed of the electromagnetic steel plate 102, the magnetic flux is shorted between the magnet pieces adjoining each other in the peripheral direction, which makes it impossible to prevent the generating torque of the motor and the efficiency of the motor from being lowered.

SUMMARY OF THE INVENTION

The present invention aims at solving the above problems found in the conventional axial gap type motor. Thus, it is an object of the invention is to provide an axial gap type motor which can prevent the short of the magnetic flux.

In attaining the above object, according to the invention as set forth in a first aspect, there is provided an axial gap type motor (in the below-mentioned exemplary embodiments, axial gap type motor 10, 10A) including:

a rotor rotatable about a rotation axis thereof and having a rotor core (in the below-mentioned exemplary embodiments, a rotor core 13), the rotor core including:

multiple main magnet pieces (in the below-mentioned exemplary embodiments, main permanent magnet pieces 41) respectively magnetized in a direction of the rotation axis of the rotor and arranged in a peripheral direction of the rotor, and multiple main magnet piece storing hole portions (in the below-mentioned exemplary embodiments, main magnet piece storing hole portions 15) respectively for holding associated main magnet pieces; and a pair of stators (in the below-mentioned exemplary embodiments, a pair of stators 12, 12) to be mounted onto the rotor from at least one side in the rotation axis direction so as to be disposed opposed to each other, wherein the rotor core is structured by winding a tape-shaped magnetic plate (in the below-mentioned exemplary embodiments, a magnetic plate 14), and includes a first winding layer and a second winding layer adjoining each other in a diameter direction of the rotor core; and in portions of the first and second winding layers that are situated in the same phase from the center of rotation of the rotor core, the first winding layer includes magnetic flux short preventive portions (in the below-mentioned exemplary embodiments, an outside magnetic flux short preventive portion 62 and an inside magnetic flux short preventive portion 52) for preventing magnetic flux from shorting, and the second winding layer includes mechanical strength maintaining portions (in the below-mentioned exemplary embodiments, an outside connecting portion 61 and an inside connecting portion 51) for securing the strength of the magnetic plate.

According to the invention as set forth in a second aspect, there is provided the axial gap type motor as set forth in the first aspect, wherein the magnetic flux short preventive portion is a communicating portion (in the below-mentioned exemplary embodiments, the inside magnetic flux short preventive portion 52) for communicating between the main magnet piece storing hole portions adjoining each other in the peripheral direction of the rotor core, and the mechanical strength maintaining portion is a closing portion (in the below-mentioned exemplary embodiments, the inside connecting portion 51) for closing the main magnet piece storing portions adjoining each other in the peripheral direction.

According to the invention as set forth in a third aspect, there is provided the axial gap type motor as set forth in the first or second aspect, wherein the rotor includes multiple magnet sub pieces (in the below-mentioned exemplary embodiments, sub permanent magnet pieces 43) respectively magnetized in a direction perpendicular to the rotation axis direction and to the diameter direction of the rotor, and the rotor core, at least on one side in the rotation axis direction between the main magnet piece storing hole portions adjoining each other in the peripheral direction of the rotor core, includes multiple sub magnet piece storing hole portions (in the below-mentioned exemplary embodiments, sub magnet piece storing hole portions 17) respectively for holding associated sub magnet pieces.

According to the invention as set forth in a forth aspect, there is provided the axial gap type motor as set forth in the third aspect, wherein the magnetic flux short preventive portion, at least on one side in the rotation axis direction, provides an opening (in the below-mentioned exemplary embodiments, the outside magnetic flux short preventive portion 62) which can be formed when the rotation axis direction outside portion of the sub magnet piece storing hole portion is opened, and the mechanical strength maintaining portion, at least on one side in the rotation axis direction, provides a closing portion (in the below-mentioned exemplary embodiments, the outside connecting portion 61) which can be formed when the rotation axis direction outside portion of the sub magnet piece storing hole portion is closed.

According to the invention as set forth in a fifth aspect, there is provided the axial gap type motor as set forth in any one of the first to forth aspects, wherein in the rotor core, the first and second winding layers respectively include the magnetic flux short preventive portion and the mechanical strength maintaining portion, and the arrangement of the magnetic flux short preventive portion and the mechanical strength maintaining portion respectively formed in the tape-shaped magnetic plate constituting the rotor core is repeated according to a given pattern.

According to the invention as set forth in a sixth aspect, there is provided the axial gap type motor as set forth in the fifth aspect, wherein in the rotor core, the arrangement of the magnetic flux short preventive portion and the mechanical strength maintaining portion respectively formed in the tape-shaped magnetic plate constituting the rotor core is repeated in according to a pattern of an integral number which does not provide a divisor of a total number of the main magnet pieces.

According to the invention as set forth in a seventh aspect, there is provided the axial gap type motor as set forth in any one of the first to sixth aspects, wherein the mechanical strength maintaining portion is non-magnetized by executing a thermal treatment thereon.

According to the invention as set forth in an eighth aspect, there is provided the axial gap type motor as set forth in the seventh aspect, wherein the tape-shaped magnetic plate is wound after the mechanical strength maintaining portion is previously non-magnetized.

According to the invention as set forth in a ninth aspect, there is provided a method for manufacturing a rotor employed in an axial gap type motor (in the below-mentioned exemplary embodiments, axial gap type motor 10, 10A), the motor including:

a rotor (in the below-mentioned exemplary embodiments, a rotor 11) rotatable about a rotation axis thereof and having a rotor core (in the below-mentioned exemplary embodiments, a rotor core 13), the rotor core including multiple main magnet pieces (in the below-mentioned exemplary embodiments, main permanent magnet pieces 41) respectively magnetized in a direction of a rotation axis of the rotor and arranged in a peripheral direction of the rotor, and multiple main magnet piece storing hole portions (in the below-mentioned exemplary embodiments, main magnet piece storing hole portions 15) respectively for holding associated main magnet pieces; and a pair of stators (in the below-mentioned exemplary embodiments, a pair of stators 12, 12) to be mounted onto the rotor from at least one side in the rotation axis direction so as to be disposed opposed to each other, the method including:

a blanking step for forming the main magnet piece storing hole portion in a tape-shaped magnetic plate (in the below-mentioned exemplary embodiments, a magnetic plate 14), and a winding step for winding the magnetic plate provided with the main magnet piece storing hole portion, wherein in the blanking step, there are formed magnetic flux short preventive portions (in the below-mentioned exemplary embodiments, an inside magnetic flux short preventive portion 52) for communicating between the main magnet piece storing hole portions adjoining each other in the peripheral direction of the rotor, and mechanical strength maintaining portions (in the below-mentioned exemplary embodiments, an inside connecting portion 51) for closing the main magnet piece storing hole portions adjoining each other in the peripheral direction.

According to the invention as set forth in a tenth aspect, there is provided a method for manufacturing a rotor employed in an axial gap type motor (in the below-mentioned exemplary embodiments, axial gap type motor 10, 10A), the motor including:

a rotor (in the below-mentioned exemplary embodiments, a rotor 11) rotatable about a rotation axis thereof and having a rotor core (in the below-mentioned exemplary embodiments, a rotor core 13), the rotor core including multiple main magnet pieces (in the below-mentioned exemplary embodiments, main permanent magnet pieces 41) respectively magnetized in a direction of a rotation axis of the rotor and arranged in a peripheral direction of the rotor, and multiple main magnet piece storing hole portions (in the below-mentioned exemplary embodiments, main magnet piece storing hole portions 15) respectively for holding associated main magnet pieces; and a pair of stators (in the below-mentioned exemplary embodiments, a pair of stators 12, 12) to be mounted onto the rotor from at least one side in the rotation axis direction so as to be disposed opposed to each other, the method including:

a blanking step for forming, in a tape-shaped magnetic plate (in the below-mentioned exemplary embodiments, a magnetic plate 14), the main magnet piece storing hole portion, and at least on one side in the rotation axis direction between the main magnet piece storing hole portions adjoining each other in the peripheral direction of the rotor, multiple sub magnet piece storing hole portions (in the below-mentioned exemplary embodiments, sub magnet piece storing hole portions 17) respectively for holding associated sub magnet pieces (in the below-mentioned exemplary embodiments, sub permanent magnet pieces 43) respectively magnetized in a direction perpendicular to the rotation axis direction of the rotor and to the diameter direction of the rotor; and a winding step for winding the magnetic plate provided with the main magnet piece storing hole portions and sub magnet piece storing hole portions, wherein in the blanking step, at least on one side in the rotation axis direction, there are formed multiple magnetic flux short preventive portions (in the below-mentioned exemplary embodiments, outside magnetic flux short preventive portions 62) which can be formed when the rotation axis direction outside portions of the sub magnet piece storing hole portions are opened, and at least on one side in the rotation axis direction, there are formed multiple mechanical strength maintaining portions (in the below-mentioned exemplary embodiments, outside connecting portions 61) which can be formed when the rotation axis direction outside portions of the sub magnet piece storing hole portions are closed.

According to the invention as set forth in an eleventh aspect, there is provided the method as set forth in the ninth or tenth aspect, further including:

prior to the winding step, a thermal treating step for thermally treating the mechanical strength maintaining portion to non-magnetize the same.

According to the invention as set forth in a twelfth aspect, there is provided the method as set forth in the eleventh aspect, wherein in the blanking step, the arrangement of the magnetic flux short preventive portion and the mechanical strength maintaining portion respectively formed in the tape-shaped magnetic plate constituting the rotor core is repeated according to a pattern of an integral number which does not provide a divisor of a total number of the main magnet pieces.

According to the invention as set forth in the first aspect, the rotor core includes a first winding layer and a second winding layer adjoining each other in the diameter direction of the rotor core. And, in such portions of the first and second winding layers that are situated in the same phase from the center of rotation of the rotor core, the first winding layer includes a magnetic flux short preventive portion for preventing a magnetic flux from shorting, and the second winding layer includes a mechanical strength maintaining portion for securing the strength of the magnetic plate. Therefore, in the same phase portions of the rotor core from the center of rotation of the rotor core wound, both the prevention of the short of the magnetic flux and the maintaining of the mechanical strength can be both realized. That is since the magnetic plate is connected by the mechanical strength maintaining portion, the rotor core can be manufactured by winding the magnetic plate and also the short of the magnetic flux can be prevented by the magnetic flux short preventive portion, thereby being able to prevent the generating torque of the motor from lowering.

According to the second and ninth aspects, the magnetic flux short preventive portion in the first winding layer, which serves as a communicating portion for allowing communication between the main magnet piece storing hole portions adjoining each other in the peripheral direction of the rotor core, allows communication between the main magnet pieces adjoining each other in the peripheral direction in the first winding layer. This make is possible to prevent the short of the magnetic flux between the main magnet pieces adjoining each other in the peripheral direction. Also, the main magnet pieces can be held respectively in their associated main magnet piece storing hole portions by the mechanical strength maintaining portions in the second winding layer, which respectively serve as closing portions for closing the main magnet piece storing hole portions adjoining each other in the peripheral direction.

According to the invention as set forth in the third aspect, since there is employed a structure which is substantially similar to a Halbach structure, the amount of generation of effective magnetic flux can be increased relatively due to the magnetic flux lens effect for regulating the direction of the magnetic flux of the main magnet piece.

According to the invention as set forth in the forth and tenth aspects, at least on one side in the rotation axis direction, the magnetic flux short preventive portions in the first winding layer, which are openings that can be formed when the rotation axis direction outside portions of the sub magnet piece storing hole portions are opened, can prevent the short of the magnetic flux on the outside portions of the sub magnet pieces. Also, at least on one side in the rotation axis direction, the mechanical strength maintaining portions in the second winding layer, which can be formed when the rotation axis direction outside portions of the sub magnet piece storing hole portions are closed, makes it possible to hold the sub magnet pieces in their respective sub magnet piece storing hole portions, thereby being able to prevent the sub magnet pieces from slipping outwardly in the rotation axis direction. In addition, the magnetic flux short preventive portions can prevent the generation of an eddy current which can be otherwise generated between the rotor and stator.

According to the invention as set forth in the fifth aspect, since the arrangement of the magnetic flux short preventive portions and mechanical strength maintaining portions formed in the tape-shaped magnetic plate constituting the rotor core is repeated according to a given pattern, the rotor core can be manufactured easily.

According to the invention as set forth in the sixth and twelfth aspects, the arrangement of the magnetic flux short preventive portions and mechanical strength maintaining portions respectively formed in the tape-shaped magnetic plate constituting the rotor core is repeated according to a pattern of an integral number which does not provide a divisor of the total number of the main magnet pieces. This can solve a problem that, in a certain phase, only the magnetic flux short preventive portions can be formed or only the mechanical strength maintaining portions can be formed.

According to the invention as set forth in the seventh aspect, since the mechanical strength maintaining portion is non-magnetized through a thermal treatment, even in the portions of the rotor core which are connected in order to maintain the mechanical strength, when they are non-magnetized, the short of the magnetic flux in these portions can be prevented.

According to the invention as set forth in the eighth and eleventh aspects, since the tape-shaped magnetic plate is wound after the mechanical strength maintaining portions thereof are previously non-magnetized, when compared with a case where the magnetic plate is thermally treated after wound, the rotor core can be manufactured easily and with high precision. Also, this can reduce the size of a space necessary for execution of the thermal treatment and thus the rotor core can be worked in a small-sized thermal treatment facility.

BRIEF DESCRIPTION OF THE DRAWINGS

FIGS. 5A to 5C are explanatory views of a rotor core including magnet pieces, FIG. 5A is a typical view of the rotor core including magnet pieces, when it is viewed from the peripheral direction of the rotor core; FIG. 5B is a typical view, when FIG. 5A is viewed from laterally; and FIG. 5C is a section view taken along the VC-VC line shown in FIG. 5A.

FIGS. 7A and 7B are explanatory views of the layer structure of the rotor core shown in FIG. 5, FIG. 7A is a typical view of the respective layers when they are viewed from the peripheral direction of the rotor, and FIG. 7B is a section view taken along the VIIB-VIIB line shown in FIG. 7A.

FIGS. 8A to 8C are explanatory views of a rotor core including magnet pieces according to a second exemplary embodiment. Specifically, FIG. 8A is a typical view of the rotor core including magnet pieces, when it is viewed from the peripheral direction thereof; FIG. 8B is a typical view when FIG. 8A is viewed from laterally thereof; and, FIG. 8C is a section view taken along the VIIIC-VIIIC line shown in FIG. 8A.

FIGS. 9A and 9B are explanatory views of the layer structure of the rotor core shown in FIG. 8, FIG. 9A is a typical view of the respective layers of the rotor core, when they are viewed from the peripheral direction of the rotor core; and, FIG. 9B is a section view taken along the IXB-IXB shown in FIG. 9A.

DETAILED DESCRIPTION OF THE PREFERRED EMBODIMENTS

Figure 1:
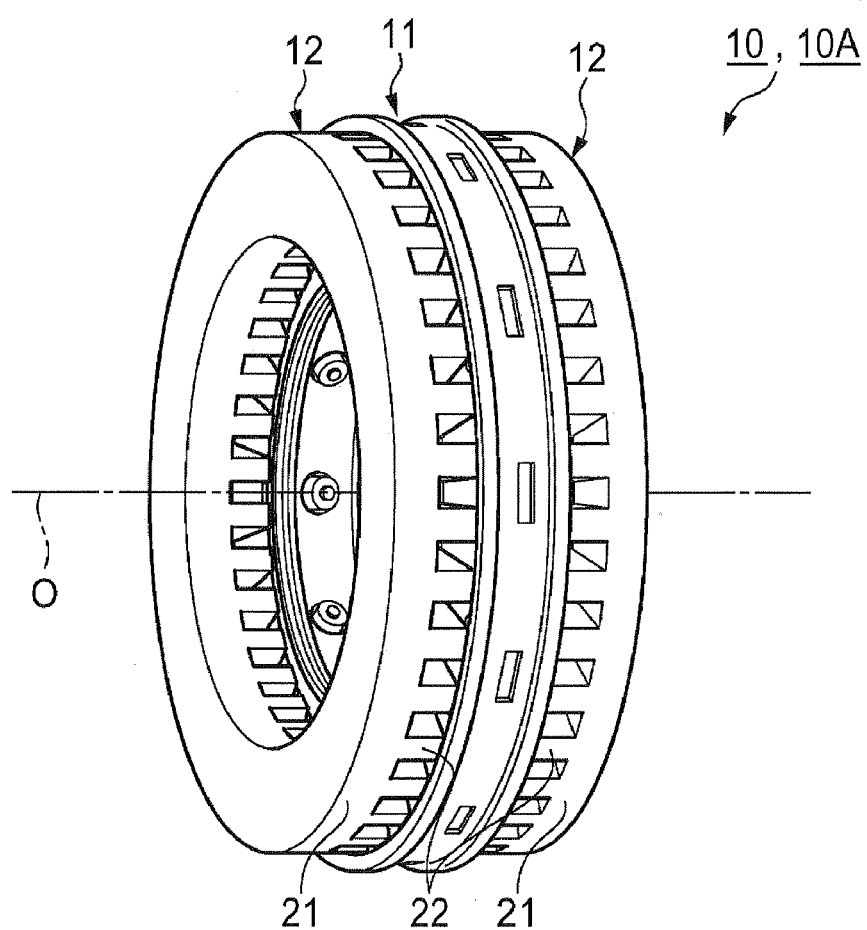
FIG. 1 is a perspective view of the whole structure of a first exemplary embodiment of an axial gap type motor according to the invention.

Now, description will be given below in detail of the respective exemplary embodiments of an axial gap type motor according to the invention with reference to the accompanying drawings. Here, the drawings are to be viewed in the direction of reference numerals.

First Exemplary Embodiment

Figure 2:
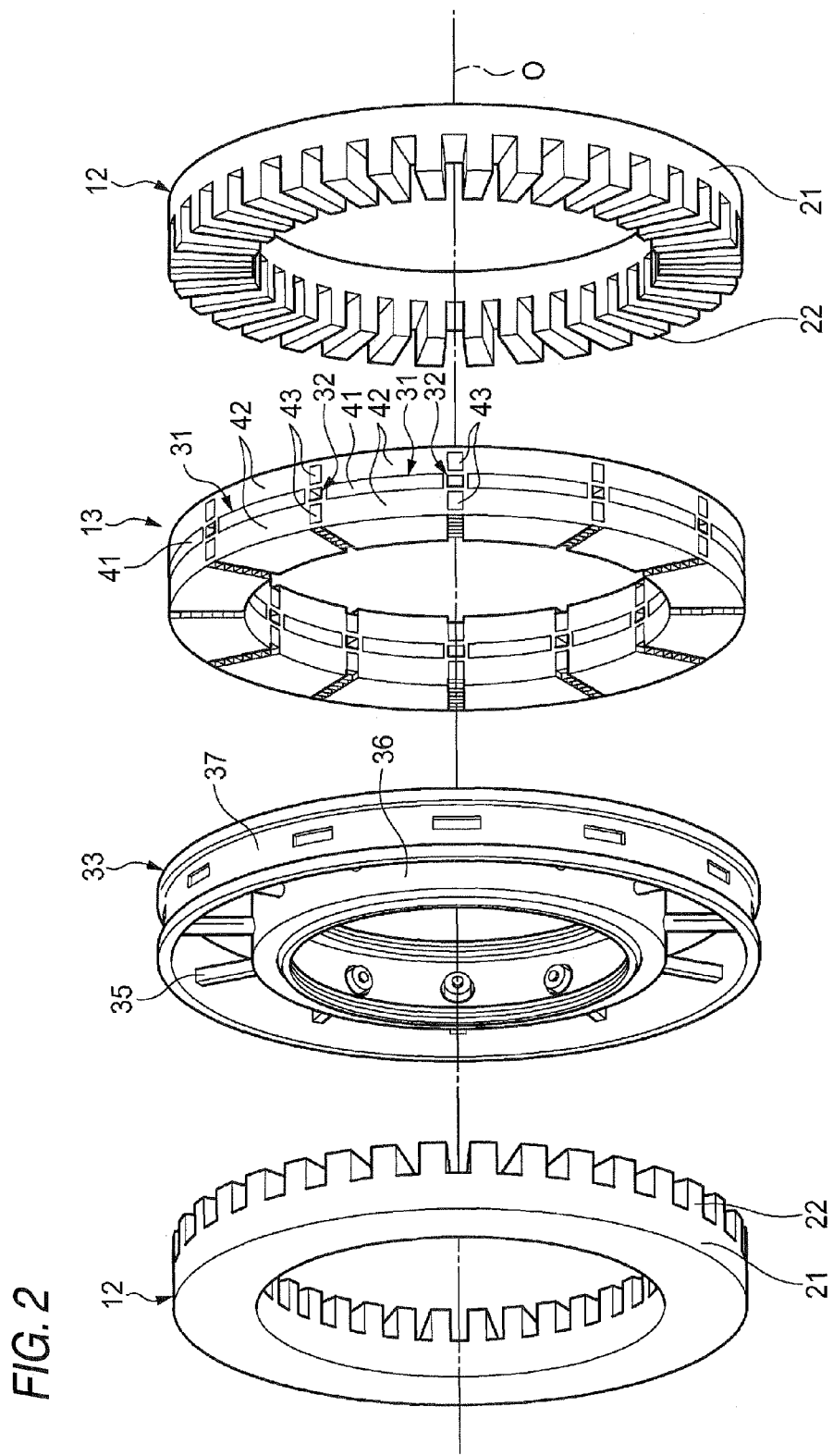
FIG. 2 is an exploded perspective view of the axial gap type motor shown in FIG. 1.

An axial gap type motor 10 according to the present exemplary embodiment, for example, as shown in FIGS. 1 and 2, includes a substantially ring-shaped rotor 11 rotatably disposed around the rotation axis 0 of the axial gap type motor 10, and a pair of stators 12 and 12 disposed opposed to each other in such a manner to hold the rotor 11 between them from both sides in the direction of the rotation axis 0, while the stators 12 have their respective multi-phase stator windings capable of generating a rotation magnetic field for rotating the rotor 11.

When the axial gap type motor 10 is carried onboard a vehicle such as a hybrid vehicle or an electric vehicle as a drive source and the output shaft of the motor 10 is connected to the input shaft of a transmission (not shown), the drive force of the axial gap type motor 10 can be transmitted through the transmission to the drive wheels (not shown) of the vehicle.

Also, when, in the reducing operation of the vehicle, a drive force is transmitted to the axial gap type motor 10 from the drive wheel side, the axial gap type motor 10 functions as a generator to generate a so called regenerative brake force and also collects the kinetic energy of a vehicle body as electric energy (regenerative energy). Further, for example, in a hybrid vehicle, if the rotation shaft of the axial gap type motor 10 is connected to the crankshaft of an internal combustion engine (not shown), also when the output of the internal combustion engine is transmitted to the axial gap type motor 10, the axial gap type motor 10 functions as a generator to generate electricity generating energy.

Each stator 12 includes a substantially ring-shaped yoke portion 21, multiple teeth 22, ..., 22 respectively projecting along the rotation axis 0 direction toward the rotor 11 from their positions on such surface of the yoke portion 21 as opposed to the rotor 11 spaced at given intervals from each other in the peripheral direction of the yoke portion 21 and also respectively extending in the diameter direction of the yoke portion 21, and stator windings (not shown) to be mounted on and between the proper teeth 22 and 22.

Each stator 12 is, for example, of a 6 N type including six main poles (for example, U+, V+, W+, U−, V−, and W−). The respective U−, V− and W− poles of the other stator 12 are so set as opposed to the respective U+, V+ and W+poles of one stator 12 in the direction of the rotation axis 0. For example, with respect to a pair of stators 12 and 12 disposed opposed to each other in the direction of the rotation axis 0, the three teeth 22, 22 and 22 of one stator 12 respectively corresponding to the U+, V+ and W+poles or the U−, V− and W− and the three teeth 22, 22 and 22 of the other stator respectively corresponding to the U+, V+ and W+poles or the U−, V− and W− are set to be disposed opposed to each other in the direction of the rotation axis 0. Thus, the stators 12 are set such that conduction states respectively for the teeth 22 of one stator 12 and the teeth 22 of the other stator 12 opposed to each other in the rotation axis 0 direction provide mutually inversed states in terms of electric angles.

The rotor 11, for example, as shown in FIG. 2, includes a rotor core 13, multiple main magnet portions 31, ..., 31, multiple sub magnet portions 32, ..., 32, and a rotor frame 33 made of a non-magnetic member. In a state where the main magnet portions 31 and sub magnet portions 32 are disposed alternately in the peripheral direction of the rotor core 13 within the rotor core 13, the rotor core 13 is stored within the rotor frame 33.

And, the rotor frame 33 includes an inner peripheral side ring-shaped shaft portion 36 and an outer peripheral side ring-shaped rim portion 37 which are connected together by multiple diameter-direction ribs 35, ..., 35 disposed at given intervals in the peripheral direction of the rotor frame 33. To the inner peripheral portion of the shaft portion 36, there can be connected an output shaft which is to be connected to an external drive shaft (for example, the input shaft of the transmission of a vehicle).

Figure 3:
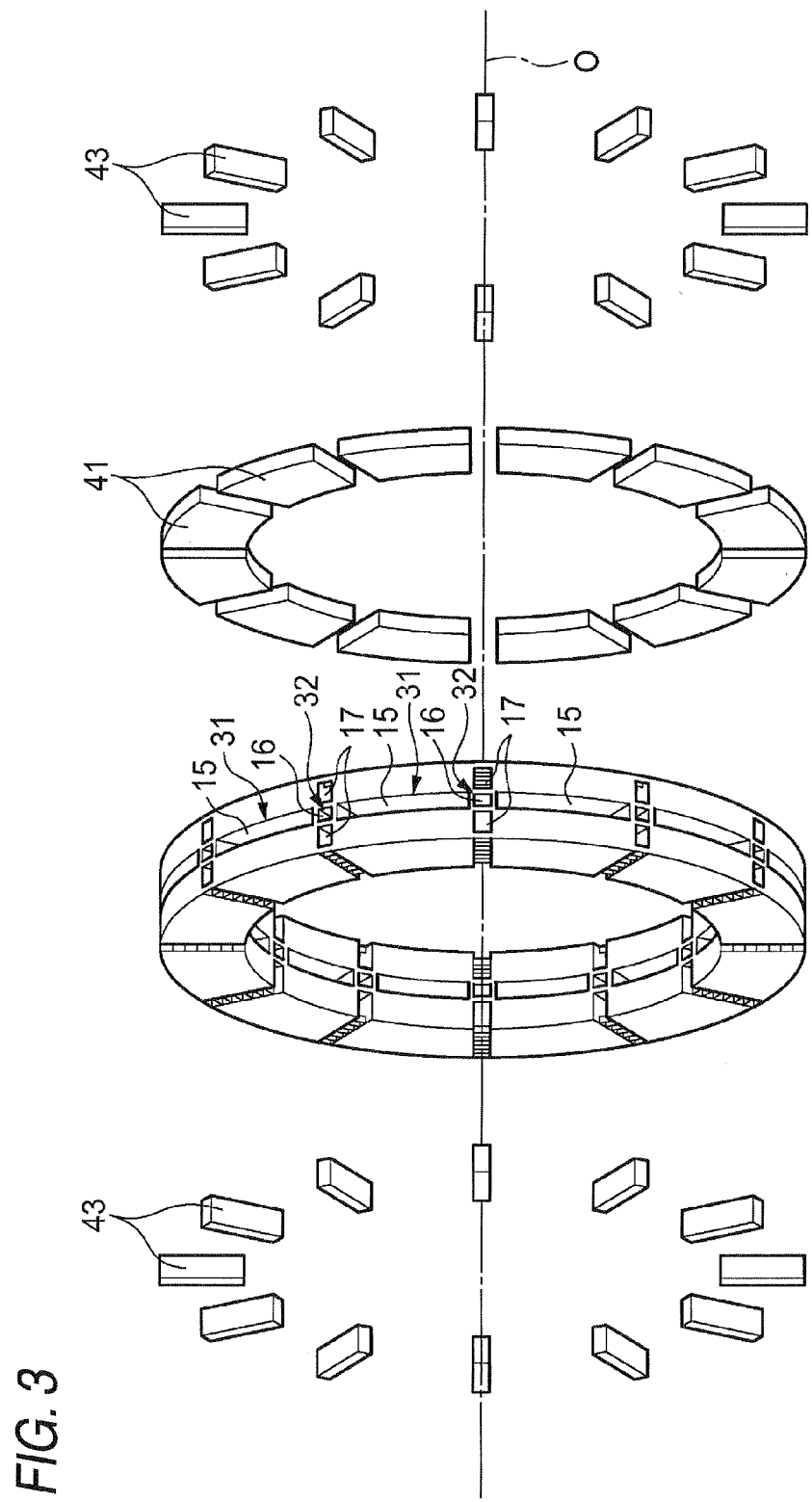
FIG. 3 is an exploded perspective view of a rotor core and magnet pieces employed in the axial gap type motor shown in FIG. 1.

The rotor core 13 can be produced by winding a magnetic plate 14 made of a tape-shaped electromagnetic steel plate. As shown in FIG. 3, multiple substantially fan-shaped main permanent magnet piece hole portions 15 for storing their respective main permanent magnet pieces 41 (which will be discussed later) in the width-direction central portions thereof and multiple columnar-shaped magnetic flux leakage restrictive spaces 16 are formed alternately at given intervals in the peripheral direction of the rotor core 13. Also, on both sides in the rotation axis 0 direction of the respective magnetic flux leakage preventive spaces 16, there are formed multiple columnar-shaped sub permanent magnet piece storing hole portions 17, 17 for storing sub permanent magnet pieces 43 (which will be discussed later). In other words, the rotor core 13 is structured as follows. That is, the rotor core 13 includes multiple yoke portions 42, ..., 42 respectively disposed to hold their associated main permanent magnet pieces 41 from both sides in the rotation axis 0 direction at given intervals in the peripheral direction of the rotor core 13; a pair of inside axial-direction connecting portions 14a and 14a respectively interposed between the main permanent magnet piece storing hole portions 15 and magnetic flux leakage preventive spaces 16 for connecting together the yoke portions 42 and 42 mutually adjoining in the rotation axis 0 direction; and, a pair of inside peripheral-direction connecting portions 14b and 14b interposed between the magnetic flux leakage preventive spaces 16 and sub permanent magnet piece storing hole portions 17 for connecting together the yoke portions 42 and 42 mutually adjoining in the peripheral direction of the rotor core 13. An inside connecting portion 51 including the inside axial-direction connecting portions 14a, 14a and inside peripheral-direction connecting portions 14b, 14b is formed in all of layers that are superimposed on top of each other (see FIG. 5C). Thus, the rotor core is structured as a single member.

Here, as shown in FIG. 5, the axial-direction length of the magnetic flux leakage preventive space 16 is set substantially equal to the axial-direction length of the main permanent magnet piece storing hole portion 15, and the peripheral-direction length of the magnetic flux leakage preventive space is set substantially equal to the peripheral-direction length of the sub permanent magnet piece storing hole portion 17.

Also, the rotor core 13, as shown in FIG. 5B, includes: in the outside portions of some superimposed layers (in the present exemplary embodiment, 4n layers: n is an integral number) of the sub magnet piece storing hole portions 17 in the rotation axis 0 direction, outside connecting portions 61 (mechanical strength maintaining portions) for connecting together the yoke portions 42 and 42 mutually adjoining in the peripheral direction of the rotor core 13 with their associated sub magnet piece storing hole portions 17 between them; and, in the outside portions of the remaining layers (4n−3, 4n−2, 4n−1: n is an integral number) of the sub magnet piece storing hole portions 17 in the rotation axis 0 direction, outside magnetic flux short restrictive portions 62 (magnetic flux short restrictive portions) in which the outside portions of the sub permanent magnet pieces 43 in the rotation axis 0 direction are opened.

The main magnet portion 31 is structured such that a substantially fan-like plate-shaped main permanent magnet piece 41, which is magnetized in the thickness direction thereof (that is, in the rotation axis 0 direction), is disposed in its associated main permanent magnet piece storing hole portion 15. And, the main permanent magnet pieces 41 and 41 of the main magnet portions 31 and 31 mutually adjoining in the peripheral direction of the rotor core 13, as shown in FIG. 6, are formed such that the magnetizing directions thereof are set different from each other.

Figure 6:
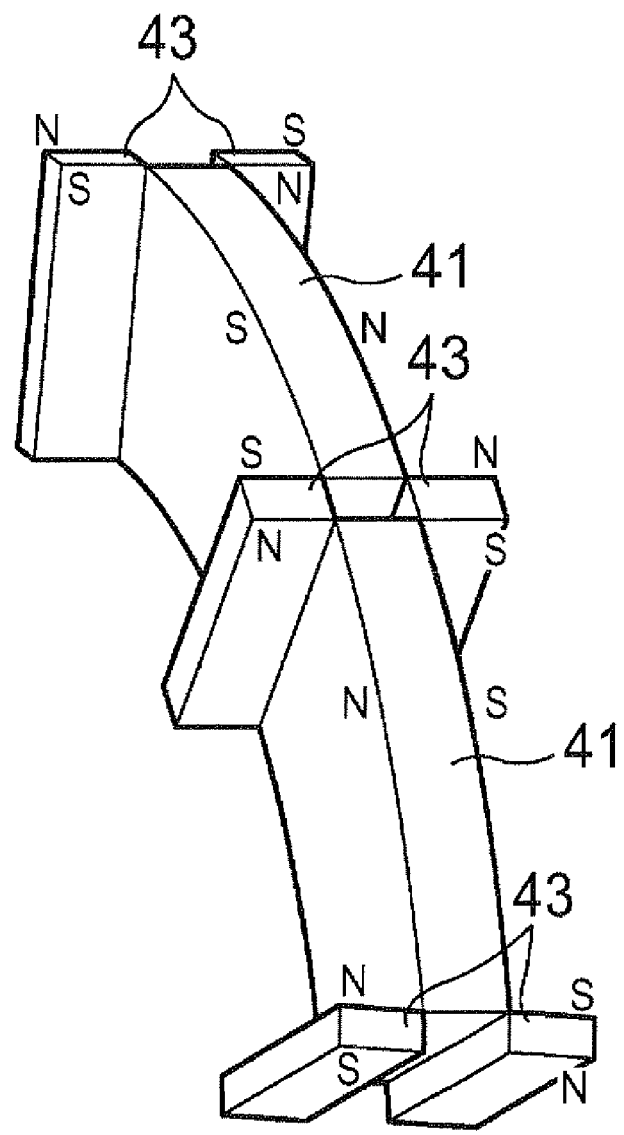
FIG. 6 is an exploded perspective view of a magnet piece portion constituting the rotor of the axial gap type motor shown in FIG. 1.
Figure 10:
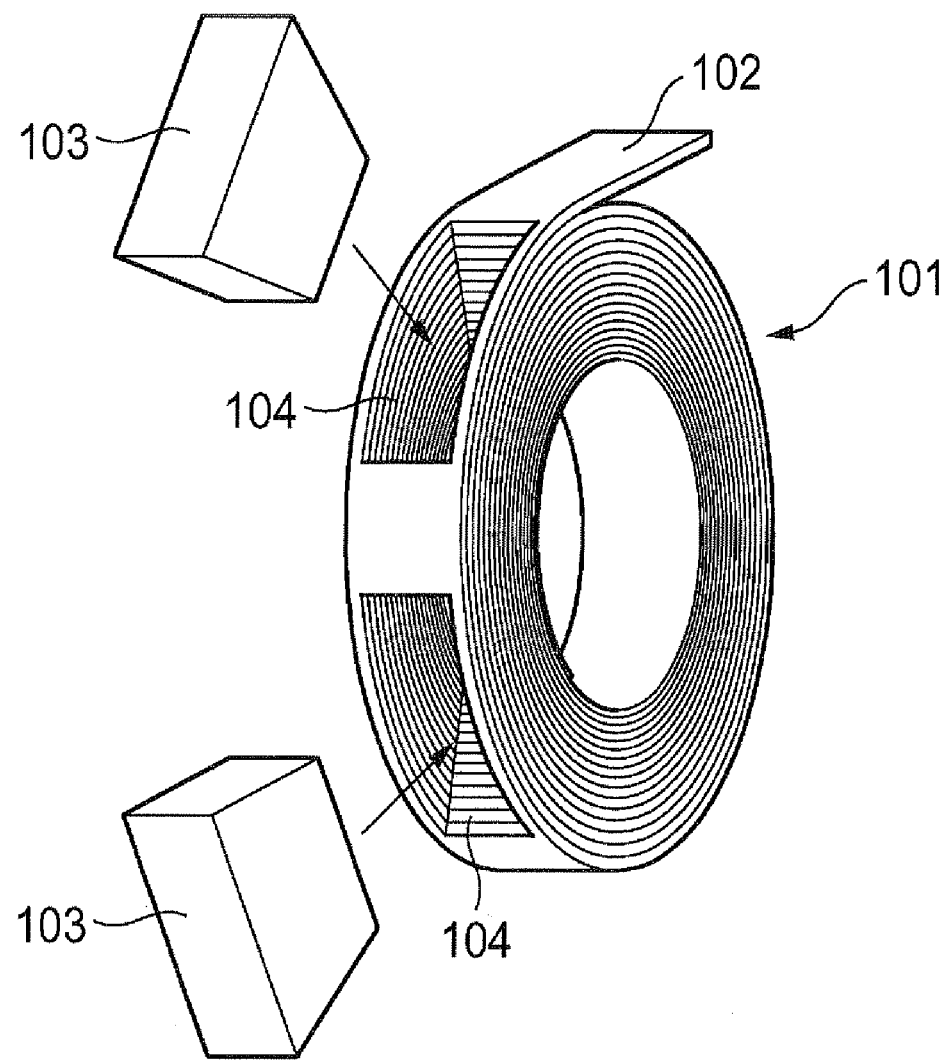
FIG. 10 is an exploded perspective view of an axial gap type motor disclosed in the JP-A 2006-166635.

The sub magnet portion 32 is structured such that, as shown in FIG. 6, a pair of sub permanent magnet pieces 43 respectively magnetized in the rotation axis 0 direction and in a direction (which is a substantially peripheral direction of the rotor core 13) perpendicular to the diameter direction of the rotor core 13 are disposed respectively within a pair of sub permanent magnet piece storing hole portions 17 and 17 formed on both sides in the width direction the magnetic flux leakage preventive space 16; and, a pair of sub permanent magnet pieces 43 and 43 opposed to each other in the rotation axis 0 direction are formed such that their magnetizing directions are set different from each other.

Also, the paired sub permanent magnet pieces 43 and 43 disposed opposed to each other in the peripheral direction of the rotor core 13 with their associated main magnet portion between them are formed such that their respective magnetizing directions are set different from each other. And, the paired sub permanent pieces 43 and 43 disposed on one side in the rotation axis 0 direction are formed such that the same magnetic poles thereof as the magnetic poles on one side of the main permanent magnet piece 41 magnetized in the rotation axis 0 direction are opposed to each other; and, the paired sub permanent pieces 43 and 43 disposed on the other side in the rotation axis 0 direction are formed such that the same magnetic poles thereof as the magnetic poles on the other side of the main permanent magnet piece 41 magnetized in the rotation axis 0 direction are opposed to each other.

In other words, as shown in FIG. 6, for example, for a main permanent magnet piece 41 one side in the rotation axis 0 direction of which is set as its N pole and the other side of which is set as its S pole, the paired sub permanent magnet pieces 43 and 43 sandwiching the yoke portion 42 from both sides in the peripheral direction of the rotor core 13 on one side of the rotation axis 0 direction are disposed such that their respective N poles are opposed to each other in the peripheral direction of the rotor core 13; and, the paired sub permanent magnet pieces 43 and 43 sandwiching the yoke portion 42 from both sides in the peripheral direction of the rotor core 13 on the other side of the rotation axis 0 direction are disposed such that their respective S poles are opposed to each other in the peripheral direction of the rotor core 13.

Therefore, owing to a magnetic flux lens effect provided by a so called permanent magnets "Halbach" arrangement, the respective magnetic fluxes of the main permanent magnet piece 41 and sub permanent magnet pieces 43 and 43 are caused to converge, whereby effective magnetic fluxes interlinking with the respective stators 12 and 12 are allowed to increase relatively.

Figure 4:
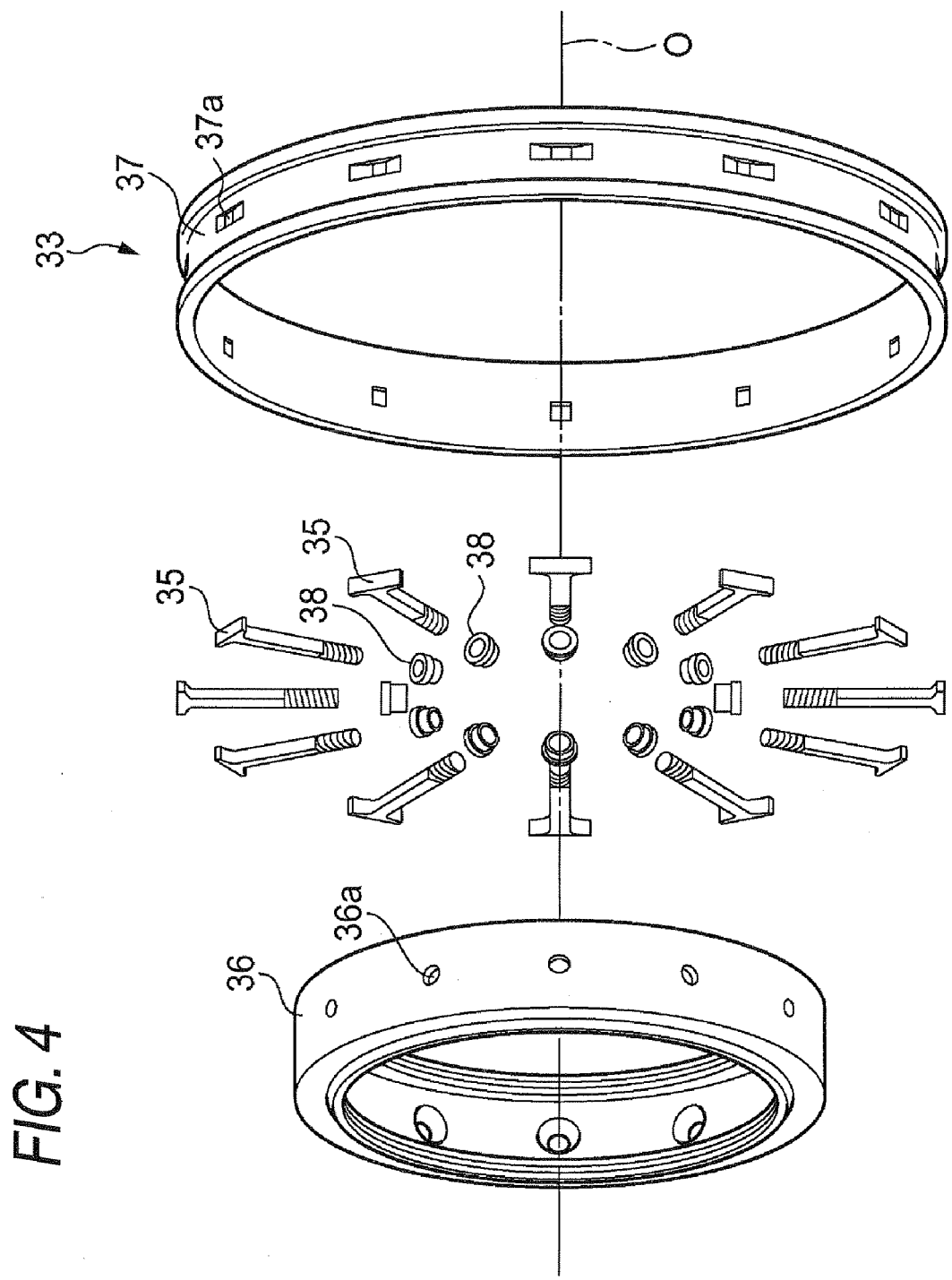
FIG. 4 is an exploded perspective view of a rotor frame employed in the axial gap type motor shown in FIG. 1.

As shown in FIG. 4, referring further to the structure of the rotor frame 33, the shaft portion 36 thereof includes multiple shaft portion side rib mounting holes 36a opened up at regular intervals in the peripheral direction of the rotor frame 33 and formed as circular-shaped penetration holes into which the diameter-direction ribs 35 can be mounted, while the rim portion 37 of the rotor frame 33 includes multiple rim portion side rib mounting holes 37a opened up at regular intervals in the peripheral direction of the rotor frame 33 and formed as rectangular-shaped penetration holes into which the diameter-direction ribs 35 can be mounted.

Also, each diameter-direction rib 35 has a substantially T-like shape. The diameter-direction inside end portion 35a of the rib 35 has a substantially circular-shaped section and includes a male screw portion; the diameter-direction outside end portion 35b and diameter-direction intermediate portion 35c of the rib 35 respectively have a rectangular-shaped section; and, the diameter-direction outside end portion 35b has a peripheral-direction length which increases gradually toward outside in the diameter direction from the diameter-direction intermediate portion 35c, and also it has a uniform axial-direction length.

And, the rotor core 13 including the main permanent magnet pieces 41 and sub permanent magnet pieces 43 is held between the shaft portion 36 and rim portion 37 from the inside and outside diameter sides of the rotor core 13, the diameter-direction intermediate portions 35c of the diameter-direction ribs 35 inserted from the rim portion side rib mounting holes 37a of the rim portion 37 are respectively fitted into the magnetic flux leakage restrictive spaces 16, the diameter-direction inside end portions 35a are respectively mounted into their associated shaft portion side rib mounting holes 36a, and nuts 38 are respectively threadedly engaged with their associated end portions 35a, whereby the diameter-direction ribs 35 are respectively fixed to the shaft portion 36.

Next, description will be given below of a method for manufacturing the rotor 11 of the axial gap type motor 10 according to the invention. Here, the width direction of the magnetic plate 14 is the rotation axis 0 direction of the rotor 11, and the longitudinal direction of the magnetic plate 14 is the peripheral direction of the rotor 11.

To manufacture the rotor core 13, as shown in FIG. 7A, for example, using a press, the magnetic plate 14 made of a tape-shaped electromagnetic steel plate is blanked to thereby form the main permanent magnet piece storing hole portions 15 and magnetic flux leakage preventive spaces 16 in the width-direction central portion of the magnetic plate 14 as well as the sub permanent magnet piece storing hole portions 17 on both sides in the width direction of the magnetic flux leakage preventive spaces 16 (blanking step). In this case, the magnetic flux leakage preventive spaces 16 of all layers are respectively surrounded by their associated inside connecting portions 51 each of which includes the inside axial-direction connecting portions 14a, 14a and inside peripheral-direction connecting portions 14b, 14b. Also, in FIG. 7A, in the portions of the rotor core 13 which, when the magnetic plate 14 is wound, provide first to third (for example, 4n−1, 4n−2, 4n−1: n is an integral number) layers from the inside diameter side of the rotor core 13, there are formed outside magnetic flux short preventive portions 62 each providing an opening formed when the width-direction outside of the sub permanent magnet piece storing hole portion 17 is opened. On the other hand, in FIG. 7A, in the portions of the rotor core 13 which, when the magnetic plate 14 is wound, provides the fourth (for example, 4n: n is an integral number) layer from the inside diameter side of the rotor core 13, there are formed outside connecting portions 61 each providing a closed portion formed when the outside of the sub permanent magnet piece storing hole portion 17 is closed.

The tape-shaped magnetic plate 14, in which there are formed the main permanent magnet piece storing hole portions 15, magnetic flux leakage preventive spaces 16 and sub permanent magnet piece storing hole portions 17 in this manner, is temporarily held on a winding core and, when the winding core is rotated, the magnetic plate 14 is wound.

Since the magnetic plate 14 is wound on the winding core, the longitudinal direction length thereof increases sequentially in order of a first layer, a second layer, a third layer, . . . from the most inside diameter side. Therefore, when the distance between the centers of the mutually adjoining magnetic flux leakage preventive spaces 16 and 16 in FIG. 7A is expressed as a pitch P, the pitch P is set such that it increases gradually in order of a first layer, a second layer, a third layer, . . . from the most inside diameter side. Also, since each main permanent magnet piece 41 has a substantially fan-like plate shape, the longitudinal direction length of the main permanent magnet piece storing hole portion 15 is also set such that it increases gradually in order of a first layer, a second layer, a third layer, . . . from the most inside diameter side. Here, in FIG. 7, for simplification of illustration, the first to fourth layers are shown in such a manner that they are all equal in the longitudinal direction thereof. And, the winding operation is ended at the position where the start and end of winding of the magnetic plate 14 wound to a given size provide the same position in the diameter direction from the center of the winding core; and, the start and end of winding of the wound magnetic plate 14 are welded together to thereby form the rotor core 13 (winding step). Here, after welding, the respective layers of the magnetic plate 14 may also be bonded together.

That is, the thus manufactured rotor core 13 has a structure in which the magnetic plate 14 made of a tape-shaped electromagnetic steel plate is wound on the winding core. Specifically, in the width-direction central portion of the rotor core 13, there are formed alternately in the peripheral direction the substantially fan-shaped main permanent magnet piece storing hole portions 15 respectively for storing their associated main permanent magnet pieces 41 and the columnar-shaped magnetic flux leakage preventive spaces 16; and, on both sides of the rotation axis 0 direction of the magnetic flux leakage preventive spaces 16, there are formed the columnar-shaped sub permanent magnet piece storing hole portions 17 respectively for storing their associated sub permanent magnet pieces 43.

Also, on the rotation axis 0 direction outside of the sub permanent magnet piece storing hole portion 17, as shown in FIGS. 5B and 5C, there are formed an outside connecting portion 61 and an outside magnetic flux short preventive portion 62 at given intervals in the diameter direction, where the outside connecting portion 61 is used to connect together the yoke portions 42 and 42 adjoining each other in the peripheral direction with the sub permanent magnet piece storing hole portion 17 between them, and the outside magnetic flux short restrictive portion 62 is formed such that the rotation axis 0 direction outside of the sub permanent magnet piece storing hole portion 17 is opened rotation axis 0 direction outside of the sub permanent magnet piece storing hole portion 17.

And, the main permanent magnet pieces 41 are respectively mounted into their associated main permanent magnet storing hole portions 15 of the rotor core 13, and the sub permanent magnet pieces 43 are mounted into the sub permanent magnet piece storing hole portions 17 of the rotor core 13.

Next, the shaft portion 36 is disposed on the inside diameter side of the rotor core 13 mounting the main permanent magnet pieces 41 and sub permanent magnet pieces 43 therein, the rim portion 37 is disposed on the outside diameter side of the rotor core 13, and the diameter-direction ribs 35 are inserted into the rotor core 13 from the rim portion side rib mounting holes 37a of the rim portion 37. In this case, the diameter-direction intermediate portions 35c of the diameter-direction ribs 35 are respectively fitted into their associated magnetic flux leakage preventive spaces 16, the diameter-direction inside end portions 35a of the ribs 35 are respectively mounted into their associated shaft portion side rib mounting holes 36a, and the nuts 38 are threadedly engaged with the diameter-direction ribs 35 from the inside diameter side of the shaft portion 36, whereby the diameter-direction ribs 35 are fixed to the shaft portion 36. In this manner, the rotor core 13 is stored into the rotor frame 33, thereby manufacturing the rotor 11.

As described above, in the axial gap type motor 10 according to the present exemplary embodiment, referring to the winding layers of the rotor core 13 adjoining each other in the diameter direction, for example, the third (the first winding layer) layer and fourth (the second winding layer) layer respectively in FIG. 7, in such portions as are present in phase with each other from the center of rotation of the rotor core 13, the third layer includes the outside magnetic flux short preventive portions 62 which are formed when the rotation axis 0 direction outside portions of the sub permanent magnet piece storing hole portions 17 are opened, whereas the fourth layer includes the outside connecting portions 61 providing closed portions which are formed when the rotation axis 0 direction outside portions of the sub permanent magnet storing hole portions 17 are closed. This structure can realize the prevention of the short of the magnetic flux and the maintenance of the mechanical strength in the same phase portions from the center of rotation of the rotor core 13 wound.

More specifically, in the third layer, since the rotation axis 0 direction outside portions of the sub permanent magnet pieces 43 are opened by the outside magnetic flux short preventive portions 62, the short of the magnetic flux between the yoke portions 42 and 42 adjoining each other in the peripheral direction of the rotor 11 with the sub permanent magnet pieces 43 between them can be restricted, thereby being able to prevent the generating torque of the motor from being lowered. Also, in the fourth layer, since the peripherally adjoining yoke portions 42 and 42 are connected together by the outside connecting portions 61, the sub permanent magnet pieces 43 can be retained in the sub permanent magnet storing hole portions 17 respectively, thereby being able to prevent the sub permanent magnet pieces 43 from slipping outwardly in the rotation axis 0 direction.

Also, as shown in FIGS. 5B and 5C, in some of the outside portions of the sub permanent magnet pieces 43 in the direction of the rotation axis 0, the peripherally adjoining yoke portions 42 and 42 are connected together by the outside connecting portions 61, and the remaining portions are formed as cut-out openings, that is, the outside magnetic flux short preventive portions 62. Therefore, an eddy current, which is generated between the rotor 11 and stator 12, is prevented from being generated in the outside magnetic flux short preventive portions 62 but can be generated only in the outside connecting portions 61. This can minimize the amount of the eddy current that is generated between the rotor 11 and stator 12.

Also, in the axial gap type motor 10 according to the present exemplary embodiment, the arrangement of the outside magnetic flux short preventive portions 62 and outside connecting portions 61 respectively formed in the tape-shaped magnetic plate 14 constituting the rotor core 13 is repeated according to a given pattern; here, the arrangement is repeated in every superimposed layer. This can facilitate the manufacture of the motor 10.

Second Exemplary Embodiment

Now, description will be given below of a second exemplary embodiment according to the invention with reference to the accompanying drawings.

FIG. 8 is a typical view of a rotor core employed in an axial gap type motor according to the second exemplary embodiment of the invention, when it is viewed in the peripheral direction thereof. Here, an axial gap type motor 10A according to the second exemplary embodiment is the same in structure as the axial gap type motor 10 according to the first exemplary embodiment except for the structure of the rotor core 13. Therefore, in the drawings, the parts of the second exemplary embodiment having the same structures as those in the first exemplary embodiment are given the same designations and thus the description thereof is omitted here.

As shown in FIG. 9A, in a magnetic plate 14 constituting a portion corresponding to the first layer of the rotor core 13, starting from left in this figure, there are arranged a single sub permanent magnet piece storing hole portion 17 including outside connecting portions 61 (mechanical strength maintaining portions), and four sub permanent magnet piece storing hole portions 17 respectively including outside magnetic flux short preventive portions 62 (magnetic flux short preventive portions); and, this arrangement is used as a pattern and these hole portions 17 are arranged successively in the peripheral direction of the rotor 11.

According to the present exemplary embodiment, since there are provided twelve main permanent magnet pieces 41 and twelve sub permanent magnet pieces 43 on one side in the direction of the rotation axis 0 (that is, twenty four sub permanent magnet pieces 43 on both sides), in second, third, . . . layer, the sub permanent magnet pieces 43 are arranged such that the pattern thereof is shifted from their adjoining layer on the inside diameter side. That is, in the first layer in FIG. 9A, the outside connecting portions 61 are formed in the sub permanent magnet piece storing hole portion 17 shown first from left in FIG. 9A. On the other hand, in the second layer, the outside connecting portions 61 are formed in the sub permanent magnet piece storing hole portion 17 shown second from left in FIG. 9A; in the third layer, the outside connecting portions 61 are formed in the sub permanent magnet piece storing hole portion 17 shown third from left in FIG. 9A; and, in the fourth layer, the outside connecting portions 61 are formed in the sub permanent magnet piece storing hole portion 17 shown fourth from left in FIG. 9A.

In the magnetic flux leakage preventive space 16 that is interposed between the sub permanent magnet piece storing hole portions 17 and 17 on both sides in the direction of the rotation axis 0 respectively including the outside connecting portions 61, there is formed an inside magnetic flux short preventive portion 52 (magnetic flux short preventive portion) for allowing the magnetic flux leakage preventive space 16 to communicate with the main permanent magnet piece storing hole portion 15 and sub permanent magnet piece storing hole portion 17; and, the main permanent magnet piece storing portions 15 and 15 adjoining each other in the peripheral direction of the rotor 11 with the magnetic flux leakage preventive space 16 between them as well as the sub permanent magnet piece storing portions 17 and 17 adjoining each other with the magnetic flux leakage preventive space 16 between them in the direction of the rotation axis 0 are formed as one opening.

On the other hand, in the magnetic flux leakage preventive space 16 that is interposed between the sub permanent magnet piece storing hole portions 17 and 17 on both sides in the direction of the rotation axis 0 respectively including the outside magnetic flux short preventive portions 62, there is formed an inside connecting portion 51 (mechanical strength maintaining portion) including a pair of inside axial direction connecting portions 14a, 14a for connecting together the yoke portions 42, 42 formed between the main permanent magnet piece storing hold portion 15 and magnetic flux leakage preventive space 16 and adjoining each other in the direction of the rotation axis 0, and a pair of inside peripheral direction connecting portions 14b, 14b for connecting together the yoke portions 42, 42 formed between the magnetic flux leakage preventive space 16 and sub permanent magnet piece storing hole portion 17 and adjoining each other in the peripheral direction of the rotor 11; and, the main permanent magnet piece storing hole portion 15, magnetic flux leakage preventive space 16 and sub permanent magnet piece storing hole portion 17 are formed respectively as independent openings. Therefore, when the tape-shaped magnetic plate 14 is wound using the outside connecting portions 61 or inside connecting portions 62, there can be produced one rotor core 13.

In this manner, by winding the tape-shaped magnetic plate 14 including the main permanent magnet piece storing hold portion 15, magnetic flux leakage preventive space 16 and sub permanent magnet piece storing hole portion 17, as shown in FIGS. 8A to 8C, on the outside of the sub permanent magnet piece storing hole portion 17 in the direction of the rotation axis 0, the outside connecting portion 61 for connecting together the yoke portions 42, 42 adjoining each other in the peripheral direction of the rotor 11 with the sub permanent magnet piece storing hole portion 17 between them, and the outside magnetic flux short preventive portion 62 formed when the outside portion of the sub permanent magnet piece storing hole portion 17 in the direction of the rotation axis 0 is opened are formed according to a given pattern in the diameter direction of the rotor 11; and, at the same time, the inside connecting portion 51 for surrounding the magnetic flux leakage preventive space 16 and the inside magnetic flux short preventive portion 52 for allowing the magnetic flux leakage preventive space 16 to communicate with the main permanent magnet piece storing hole portion 15 and sub permanent magnet piece storing hole portion 17 are also formed according to a given pattern in the diameter direction of the rotor 11.

Thus, in the axial gap type motor 10A according to the present exemplary embodiment, since, on the rotation axis 0 direction outside portions of the sub permanent magnet piece storing hole portion 17, there are provided the outside connecting portion 61 and outside magnetic flux short preventive portion 62, the slippage of the sub permanent magnet piece 43 stored in the sub permanent magnet storing hole portion 17 can be prevented by the outside connecting portion 61 and the short of the magnetic flux on the rotation axis 0 direction outside of the sub permanent magnet piece storing hole portion 17 can be prevented by the outside magnetic flux short preventive portion 62, which makes it possible to prevent the generating torque of the motor 10 from lowering.

Also, as shown in FIGS. 8B and 8C, in some of the rotation axis 0 direction outside portions of the sub permanent magnet piece storing hole portion 17, the yoke portions 42 and 42 adjoining each other in the peripheral direction of the rotor 11 are connected together by the outside connecting portions 61, while the remaining portions thereof are cut out into openings to provide the outside magnetic flux short preventive portions 62. Therefore, an eddy current, which is generated between the rotor 11 and stator 12, is prevented from generating in the outside magnetic flux short preventive portions 62 but can be generated only in the outside connecting portions 61, which can minimize the amount of the eddy current generated between the rotor 11 and stator 12.

Also, according to the axial gap type motor 10A according to the present exemplary embodiment, since, in the periphery of the magnetic flux leakage preventive space 16, there are included the inside magnetic flux short preventive portion 52 and inside connecting portion 51, while holding the main permanent magnet piece 41 by the inside connecting portion 51, the short of a magnetic flux in the periphery of the magnetic flux leakage preventive space 16 can be prevented by the inside magnetic flux short preventive portion 52, thereby being able to prevent the lowered generating torque of the motor.

Here, according to the present exemplary embodiment, on the rotation axis 0 direction outside portions of the five sub permanent magnet piece storing hole portions 17, 17, 17, 17 and 17 arranged in the peripheral direction of the rotor 11, there are formed one outside connecting portion 61 and four magnetic flux leakage preventive spaces 16 in the peripheral direction of the rotor 11 sequentially in this order starting from left in the drawings, and the arrangement is provided as a pattern. However, this is not limitative but, for the rotor 11 including multiple main permanent magnet pieces 41, there may also be applied a pattern employing an integer number which does not provide a divisor of the total number of the main permanent magnet pieces 41, whereby, in the state of layers superimposed, the outside magnetic flux short preventive portion 62 and outside connecting portion 61 as well as the inside connecting portion 51 and inside magnetic flux short preventive portion 52 can be arranged in a well-balanced manner.

Third Exemplary Embodiment

Now, description will be given below of a third exemplary embodiment according to the invention.

An axial gap type motor according to the third exemplary embodiment can be realized in such a manner that the inside connecting portions 51 and outside connecting portions 61 of the axial gap type motor 10A according to the second exemplary embodiment are thermally treated and are thereby non-magnetized. This makes it possible to prevent a magnet flux from being shorted through the inside connecting portions 51 and outside connecting portions 61.

In this case, after formation of the main permanent magnet piece storing hole portions 15, magnetic flux leakage preventive spaces 16 and sub permanent magnet piece storing hole portions 17, the inside connecting portions 51 and outside connecting portions 61 are thermally treated and non-magnetized (thermal treatment step) before the magnetic plate 14 is wound, whereby, while preventing the deteriorated performance of the motor, the short of the magnetic flux can be prevented.

Here, in the third exemplary embodiment, the inside connecting portions 51 and outside connecting portions 61 according to the second exemplary embodiment are thermally treated and are thereby non-magnetized. However, the inside connecting portions 51 and outside connecting portions 61 according to the first exemplary embodiment may also be thermally treated for non-magnetization.

Here, the invention is not limited to the above-mentioned respective exemplary embodiments but it can also be changed or improved properly.

In the first to third exemplary embodiments, the magnetic flux leakage preventive space 16 is interposed between the main permanent magnet piece storing hole portions 15 and 15 adjoining each other in the peripheral direction of the rotor 11. However, the magnetic flux leakage preventive space 16 may not be provided but, instead, there may be provided an inside connecting portion 51 having a substantially square shape. In this case, the inside connecting portion 51 may preferably be non-magnetized through thermal treatment; and, the shaft portion 36 and rim portion 37 of the rotor frame 33 can be fixed by pressure insertion or by shrinkage fit.

In the first to third exemplary embodiments, the diameter-direction rib 35 may not be fitted into the magnetic flux leakage preventive space 16 but, instead, the inside of the magnetic flux leakage preventive space 16 may also be formed as an air gap or may include a partition member made of a non-magnetic member. The air gap or the partition member made of a non-magnetic member can also prevent the leakage of the magnetic flux. In this case, the shaft portion 36 and rim portion 37 can be fixed to the rotor core 13 by pressure insertion or by shrinkage fit. Especially, in the second exemplary embodiment, the outside magnetic flux short preventive portion 62 and outside connecting portion 61 are formed on the rotation axis 0 direction outside portion of the sub permanent magnet storing hole portion 17. Alternatively, however, a non-magnetic member may be mounted into the sub permanent magnet piece storing portion 17; for the rotation axis 0 direction outside portion of the sub permanent magnet storing hole portion 17, in all layers and phase portions, there may also be formed outside connecting portions 61; and, between the main permanent magnet pieces 41 and 41 which adjoin each other in the peripheral direction of the rotor 11, there may also be formed an inside connecting portion 51 and an inside magnetic flux short preventive portion 52.

In this case, since the non-magnetic member is used instead of the sub permanent magnet piece 43, the short of the magnetic flux will not be caused on the rotation axis 0 direction outside portion of the sub permanent magnet storing hole portion 17. And, the inside magnetic flux short preventive portion 52, which is a communicating portion for allowing communication between the main permanent magnet piece storing portions 15 and 15 adjoining each other in the peripheral direction of the rotor 11, allows communication between the main permanent magnet pieces 41 and 41 adjoining each other in the peripheral direction, whereby the short of the magnetic flux between the main permanent magnet pieces 41 and 41 adjoining each other in the peripheral direction can be prevented. Also, the main permanent magnet piece 41 can be held in the main magnet piece storing hole portion 15 by the inside connecting portion 51 serving as a closing portion for closing the main permanent magnet storing portions 15 and 15 which adjoin each other in the peripheral direction.

Further, in the first to third exemplary embodiments, the stator 12 may also be provided only on one side in the direction of the rotation axis 0. In this case, the sub permanent magnet pieces 43 may be provided only on one side in the rotation axis 0 direction; and, on the other side, there may not be formed the sub permanent magnet storing hole portions 17 but the whole of the other side may also be formed as a back yoke.

What is claimed is:

1. An axial gap motor comprising:
a rotor rotatable about a rotation axis thereof and having a rotor core,
the rotor core including:
multiple main magnet pieces respectively magnetized in a direction of the rotation axis of the rotor and arranged in a peripheral direction of the rotor, and
multiple main magnet piece storing hole portions respectively for holding associated main magnet pieces; and
a pair of stators to be mounted onto the rotor from at least one side in the rotation axis direction so as to be disposed opposed to each other, wherein
the rotor core is structured by winding a tape-shaped magnetic plate, and includes a first winding layer and a second winding layer adjoining each other in a diameter direction of the rotor core; and
in portions of the first and second winding layers that are situated in the same phase from the center of rotation of the rotor core, the first winding layer includes magnetic flux short preventive portions for preventing magnetic flux from shorting, and the second winding layer includes mechanical strength maintaining portions for securing the strength of the magnetic plate.

2. The axial gap motor as set forth in claim 1, wherein
the magnetic flux short preventive portion is a communicating portion for communicating between the main magnet piece storing hole portions adjoining each other in the peripheral direction of the rotor core, and
the mechanical strength maintaining portion is a closing portion for closing the main magnet piece storing portions adjoining each other in the peripheral direction.

3. The axial gap motor as set forth in claim 1, wherein
the rotor includes multiple sub magnet pieces respectively magnetized in a direction perpendicular to the rotation axis direction and to the diameter direction of the rotor, and
the rotor core, at least on one side in the rotation axis direction between the main magnet piece storing hole portions adjoining each other in the peripheral direction of the rotor core, includes multiple sub magnet piece storing hole portions respectively for holding associated sub magnet pieces.

4. The axial gap motor as set forth in claim 3, wherein
the magnetic flux short preventive portion, at least on one side in the rotation axis direction, provides an opening which can be formed when the rotation axis direction outside portion of the sub magnet piece storing hole portion is opened, and
the mechanical strength maintaining portion, at least on one side in the rotation axis direction, provides a closing portion which can be formed when the rotation axis direction outside portion of the sub magnet piece storing hole portion is closed.

5. The axial gap motor as set forth claim 1, wherein
in the rotor core, the first and second winding layers respectively include the magnetic flux short preventive portion and the mechanical strength maintaining portion, and
the arrangement of the magnetic flux short preventive portion and the mechanical strength maintaining portion respectively formed in the tape-shaped magnetic plate constituting the rotor core is repeated according to a given pattern.

6. The axial gap motor as set forth in claim 5, wherein
in the rotor core, the arrangement of the magnetic flux short preventive portion and the mechanical strength maintaining portion respectively formed in the tape-shaped magnetic plate constituting the rotor core is repeated in according to a pattern of an integral number wherein said integral number is not a divider to a total number of the main magnet pieces.

7. The axial gap motor as set forth in claim 1, wherein
the mechanical strength maintaining portion is non-magnetized by executing a thermal treatment thereon.

8. The axial gap motor as set forth in claim 7, wherein
the tape-shaped magnetic plate is wound after the mechanical strength maintaining portion is previously non-magnetized.

* * * * *